United States Patent [19]

French et al.

[11] Patent Number: 4,533,251
[45] Date of Patent: Aug. 6, 1985

[54] APPARATUS AND PROCESS FOR AUTOMATICALLY MEASURING APERTURE SIZE OF APERTURED MATERIAL

[75] Inventors: Kenneth French, Merrimack, N.H.; Robert C. Kocher, Harvard, Mass.; Alfred Piorkow, Lancaster, S.C.; Kenneth Shaner, Towanda, Pa.; J. Thomas Smith, Acton, Mass.

[73] Assignee: GTE Products Corporation, Stamford, Conn.

[21] Appl. No.: 158,023

[22] Filed: Jun. 9, 1980

[51] Int. Cl.³ .............................................. G01B 11/02
[52] U.S. Cl. .................................... 356/384; 356/394; 356/400
[58] Field of Search ............... 356/394, 381, 237, 378, 356/383–384, 380, 387, 400; 250/237 R, 560, 562; 350/34, 81

[56] References Cited

U.S. PATENT DOCUMENTS

| 2,532,964 | 12/1950 | Taylor et al. | 356/384 |
| 2,657,611 | 11/1953 | Borth | 356/394 |
| 3,554,630 | 1/1971 | Rogers, Jr. | 350/34 |
| 3,906,239 | 9/1975 | Smith et al. | 356/237 |
| 3,989,386 | 11/1976 | Smith | 356/378 |
| 4,153,371 | 5/1979 | Koizumi et al. | 356/400 |
| 4,172,553 | 10/1979 | Feather et al. | 356/378 |

OTHER PUBLICATIONS

Ragland, Jr., F. R., "Method of Measuring the Width of Apertures in a PI Shadow Mask", RCA Tech. Notes, TN No. 1231, mailed 9-6-79.
Balmer et al., "Novel Electro-Optical Techniques in Metrology", Electronics & Power, vol. 22, 1-1976, pp. 27–30.

Primary Examiner—William H. Punter
Attorney, Agent, or Firm—Thomas H. Buffton

[57] ABSTRACT

Apparatus for automatically measuring aperture size of apertured material includes a means for supporting and transporting the apertured material and a light source providing a light beam directed for passage through the apertured material to a light detector and is characterized by a comparator mask of alternate light transparent and opaque sectors of a given dimension and means for overlaying the apertured material with the comparator mask to provide a given length of light transparent slot and responsive to signals representing light transmitted through the given length of slot for deriving a signal representing the width of the slots of the slotted material. Also, a process for automatically measuring aperture size includes the steps of overlaying the slotted material with the comparator mask and utilizing a signal from the light detector representing light transmission of the slots of a given length to derive a signal representative of the slot width.

17 Claims, 5 Drawing Figures

4,533,251

APPARATUS AND PROCESS FOR AUTOMATICALLY MEASURING APERTURE SIZE OF APERTURED MATERIAL

TECHNICAL FIELD

This invention relates to automatic measurement of apertures in apertured material and more particularly to apparatus and a process for automatically measuring apertures in material suitable to the fabrication of cathode ray tubes.

BACKGROUND ART

Conventional cathode ray tubes suitable to color television include an envelope having a viewing area with an inner surface covered by phosphors to provide a correct color and image rendition when impinged by an electron beam emanating from an electron gun. Disposed intermediate the electron gun and the inner surface of the viewing area is an aperture mask having a plurality of closely spaced apertures. These apertures are of a dimension and configuration such that ideally the electron beam is prohibited from striking phosphors other than those which provide the correct and desired color and image rendition.

Normally, the above-mentioned aperture masks are made from a metallic material, such as steel, and the apertures are effected by way of well-known photochemical machining process. Also, it has been a common practice to utilize a so-called phosphor-dot type screen wherein the aperture mask included a plurality of substantially circular holes whereby the phosphor dots were deposited onto the inner surface of the viewing area.

Accordingly, the dimensions of the holes and the resultant phosphor dots were critical in order to provide proper impingement of the phosphor dot by an electron beam. To insure the correctness of these critical dimensions, one technique provided a magnification apparatus whereby an inspector visually checked each aperture mask and passed or rejected the part. Obviously, such a technique is not only cumbersome and slow but also subject to operator error and judgement decisions.

Following, it was found that light transmission of the holes in the aperture mask provided information sufficient to accurately determine the hole size. Thus, the undesired relatively slow and relatively inaccurate magnification apparatus employing an operator and relying upon operator judgement was rendered obsolete and a faster more accurate light transmission technique evolved.

However, the phosphor-dot type of cathode ray tube is being rapidly replaced by the so-called "slotted" mask type of cathode ray tube structure. Therein, the apertures are in the form of slots, rather than holes, and the phosphors are in the form of stripes rather than dots. Thus, the new slotted arrangement requires measurements of both length and width if correct dimensional configurations are to be determined as compared with the relatively simple prior known holes wherein a single diametrical measurement was sufficient.

In an attempt to provide satisfactory measurements of the so-called "slots", a return was made to the so-called magnification process wherein a microscope and an operator were used to determine one dimension of the slot. Then, light transmission of the total slot was combined with this one microscopic measurement to determine the remaining dimension or width of the slots of the slotted aperture mask.

Although the above-mentioned technique has been and probably still is used with varying degrees of success, it has been found that the results leave something to be desired in so far as both accuracy and measurement efficiency are concerned. More specifically, it has been found that the technique again relies upon relatively inconsistent and inaccurate operator judgement. Moreover, undesired but relatively common variations and rounded ends of the slots render operator judgement and resultant accuracy difficult if not impossible.

SUMMARY OF THE INVENTION

In one aspect of the present invention, a comparator mask having alternate light transparent and opaque sectors of a known dimension is overlayed on a slotted apertured material. The comparator mask is positioned such that the rounded ends of the slots are masked by the opaque sectors and a given light transparent slot length is provided. The light transmission of the slot of a known length is determined and a signal provided which is combined with the known slot length to derive a signal representative of the slot width.

In another aspect of the invention, a process for measuring the aperture size of slotted apertured material includes the employment of a light source to provide a light beam directed for passage through the slotted apertured material and impingement of a light detector, the overlayment of the slotted apertured material with a comparator mask of alternate light transparent and opaque sectors in a manner to provide light transparent slots of a given length, and utilizing a signal from the light detector representative of the light transmission of the slots of a given length in conjunction with the known slot length to derive a signal representing the width of the light transparent slots.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
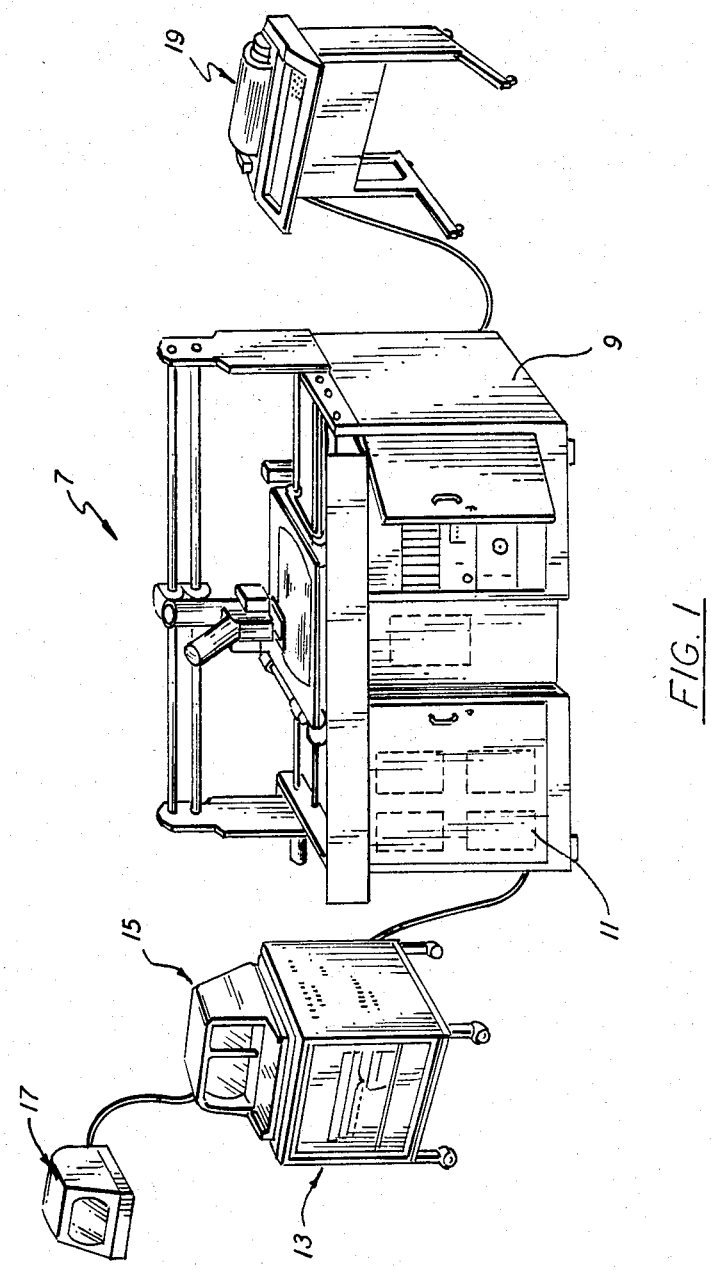
FIG. 1 is a diagrammatic illustration of an apparatus for automatically measuring the aperture size of an apertured material.

Referring to FIG. 1 of the drawings, the apparatus of this disclosure includes a modified densitometer 7 upheld by a substantially desk-size enclosure 9 wherein is disposed a plurality of power supplies and associated driving apparatus 11. A computer 13 and attendent video display terminal 15 are coupled to the power supply and associated apparatus 11 of the modified densitometer 7. Preferably, a remote video display 17 is coupled to the computer 13 while a printer 19 may be associated with the modified densitometer 7.

Figure 2:
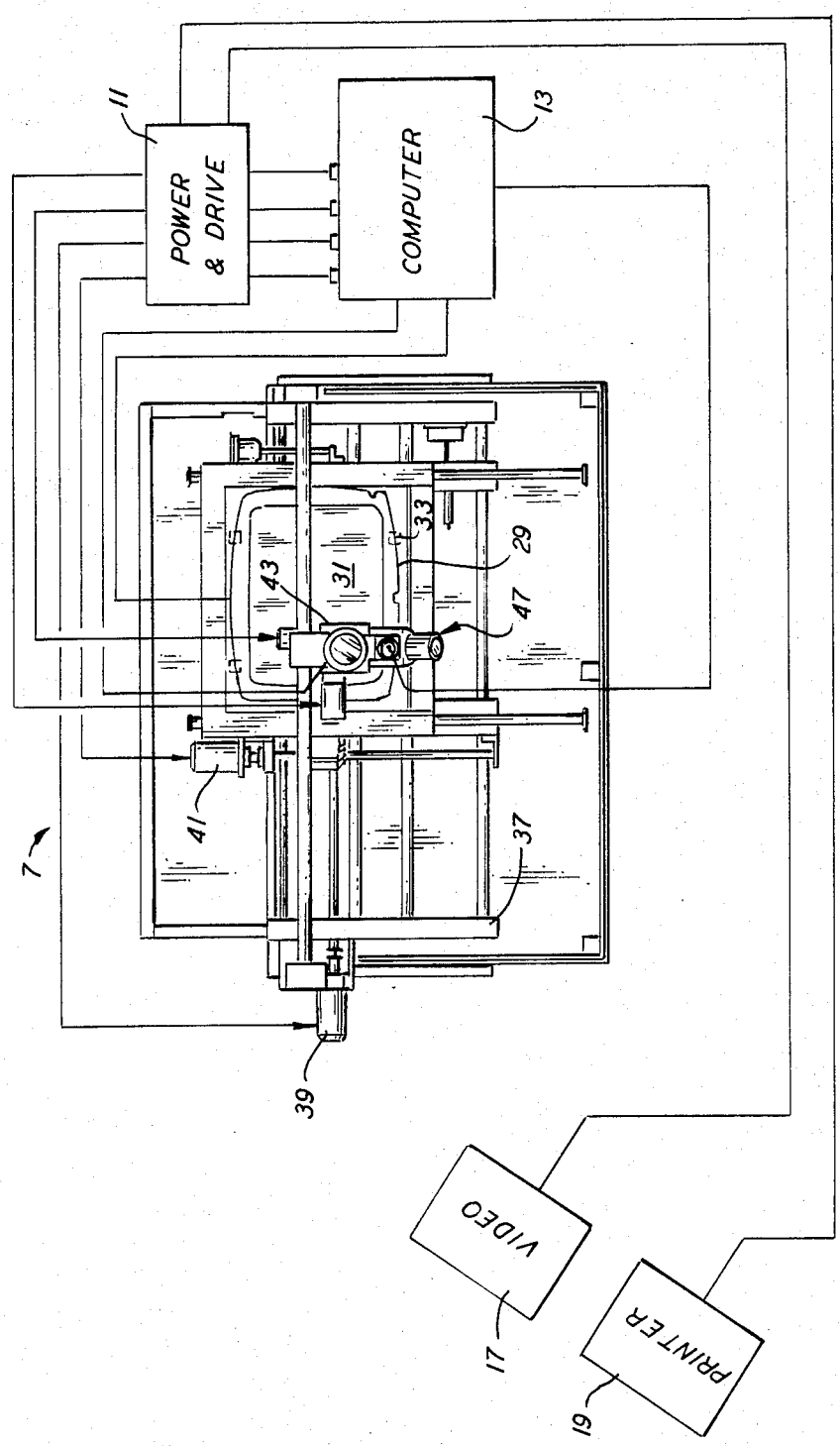
FIG. 2 is a plan view of portions of the apparatus of FIG. 1.
Figure 3:
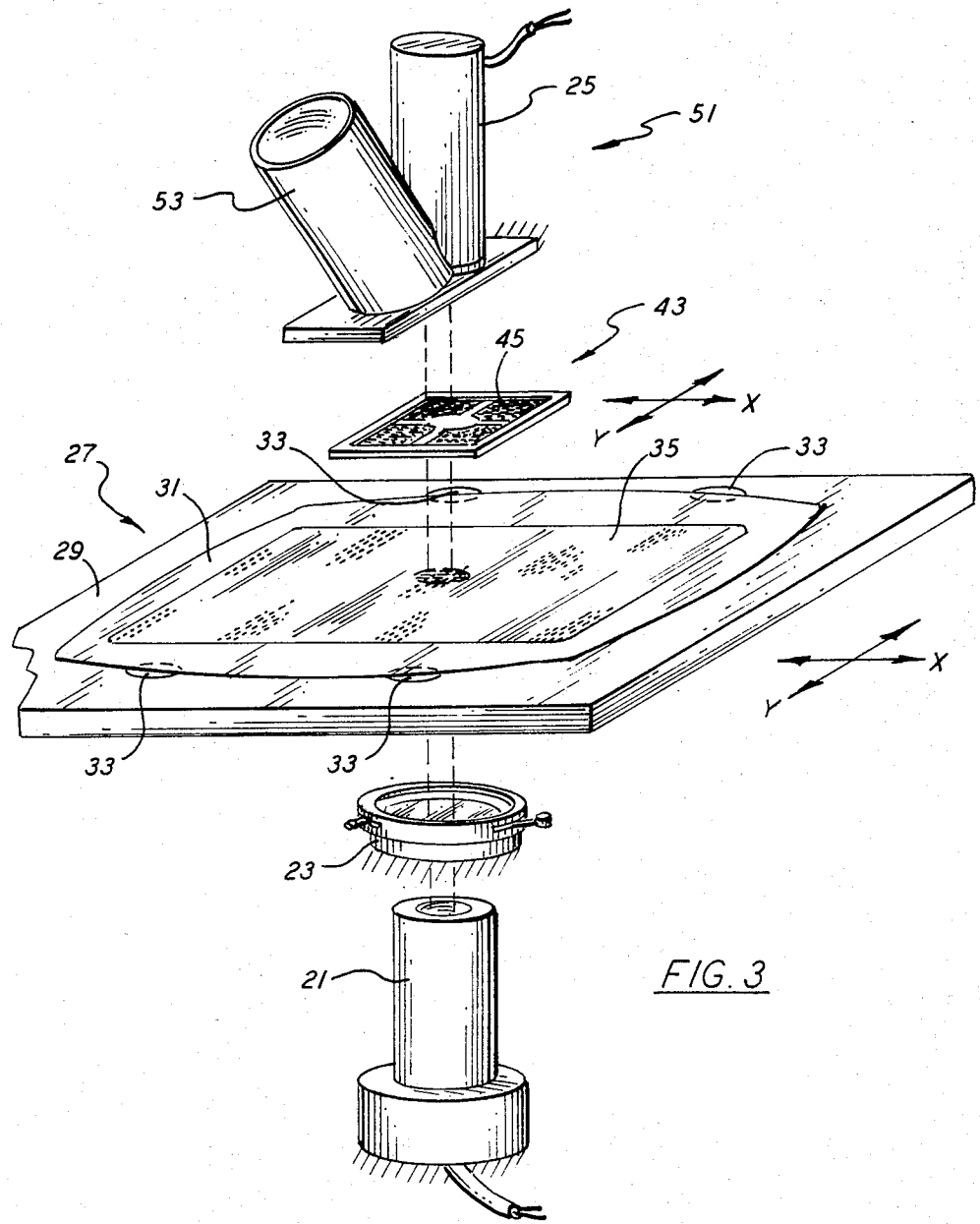
FIG. 3 is an exploded view of the operational components of the apparatus of FIG. 2.

Referring to FIGS. 2 and 3, the modified densitometer 7 includes a light source and collimator 21 and an associated electronic shutter 23 located within the desk-size enclosure 9. This light source and collimator 21 and electronic shutter 23 are coupled and responsive to the power supplies and associated apparatus 11 as well as to the computer 13. Also, a light detector 25 is spaced from and aligned with the light source and collimator 21 and the electronic shutter 23 and coupled to the computer 13.

A first support and transport means for apertured material in the form of an x-y translation stage 27 is disposed immediately adjacent the electronic shutter 23 and positionally locatable in a light beam provided by the light source and collimator 21 and directed to impinge the light detector 25. This first x-y translation stage 27 consists of a contoured frame 29 wherein glass trays 31 of various sizes may be inserted. Preferably, the glass inserts 31 are designed to accommodate cathode ray tube aperture masks having a diagonal measurement in the range of about 10–25 inches.

The contoured frame 29 includes a plurality of magnets 33 which are either manually or computer controlled and serve to affix metallic apertured material 35, such as an aperture mask for cathode ray tubes, to the contoured frame 29. Also, the contoured frame 29 is movably disposed on a support frame and track assembly 37 having a pair of stepping motors 39 and 41 attached thereto and coupled to the power supplies and associated apparatus connected to the computer 13. Moreover, position displacement transducers (not shown) provide electrical signals to the computer 13 indicative of the positional location of the contoured frame 29.

Mounted above the first support and transport means or first x-y translation stage 27 is a second support and transport means or second x-y translation stage 43. This second x-y translation stage 43 provides support for and movement of a comparator mask 45 disposed thereon. Also, the second x-y translation stage 43 is coupled and responsive to the computer 13 for alignment thereof with the apertured material 35.

Figure 4:
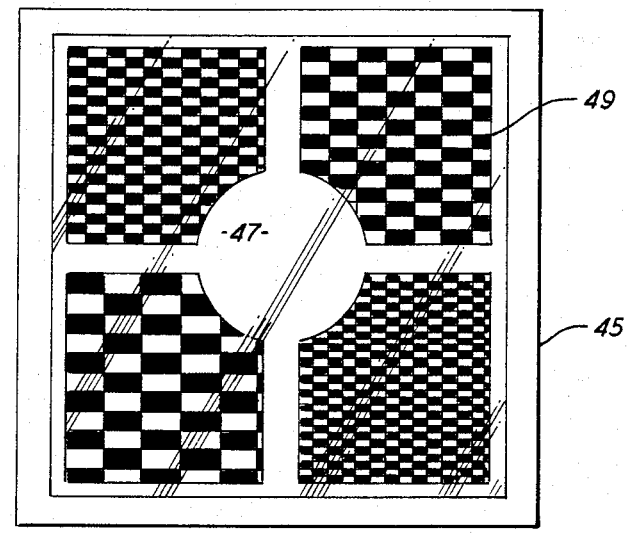
FIG. 4 illustrates a preferred form of comparator mask.

Further the comparator mask 45 preferably, but not necessarily, is of the form illustrated in FIG. 4 and includes a clear or transparent section 47 as well as multiple sections 49 of alternate opaque and transparent sectors with each separate section 49 having opaque and transparent sectors differing in size from the other sections 49. Thus, a section 49 appropriate to the particular spacing of the apertured material 35 at a given location may be selected.

Located above the second support and transport means or second x-y translation stage 43 is a measuring head assembly 51. This measuring head assembly 51 includes the previously mentioned light detector 25 as well as an operator viewing system 53. Preferably, the light detector 25 includes a series of filters and optics for reducing the diameter of a light beam and a silicon detector responsive to the light beam to provide output signals of a magnitude dependent upon the quantity of transmitted light.

Also, the operator viewing system 53 preferably includes a lens and mirror system (not shown) wherein the mirror can be flipped into and out of the light beam. In this manner, an operator can observe registration of the apertured material 35 and comparator masks 45 without deleterious effect upon the measuring capabilities and reliability of measurement signals provided by the light detector 25.

Additionally, a pdp 11 V03 computer 13 manufactured by the Digital Equipment Company of Maynard, Mass. is programmed and utilized for positional control of the apertured material 35 and comparator mask 45, receptation of the resultant optical transmission readings and calculation and provision of signals representative of the aperture size of the apertured material 35. In other words, movement of the first and second x-y translation stages 27 and 43 and operation of the electronic shutter 23 and the light source and collimator 21 as well as safety and limit switches (not shown) in addition to the reception of detected signals representative of optical transmission data and the interpretation of these signals, calculation of signals representative of aperture size and application of these calculated signals to display devices are all provided by the pdp 11 V03 computer 13.

As to operation, the pdp 11 V03 computer 13 includes a data file capability wherein each type of apertured material or aperture mask for a cathode ray tube is defined and catagorized. For example, the data file on each type of aperture mask defines a preselected number of positions for optical measurement as well as the expected values and acceptable ranges of percent optical transmission, aperture width and width intermediate the apertures for each positional location. Also, the data file provides for selection of the proper section 49 of the comparator mask 45 at each measurement location. Thus, the operator selects the data file to be utilized for the particular aperture material under consideration.

Also, the computer 13 automatically activates the modified densitometer 7 at the beginning of a measurement procedure to provide a calibration base. Prior to the positioning of the apertured material on the first x-y translation stage 27, a clear transparent area of the comparator mask 45 is positioned in the light beam and the first x-y translation stage 27 automatically moves to each position of measurement indicated in the data file. Thereat, the shutter 23 is opened and closed by the computer 13 and a reading of optical transmission for the open and closed shutter 23 condition at each measurement location is provided by the light detector 25 and coupled to the computer 13. Thus, a 0 and 100 percent optical transmission measurement at each measurement position is stored in the computer for use in optical transmission comparison and aperture dimension calculations.

Having calibrated the apparatus for a particular apertured material or aperture mask 35, an operator positions the apertured material 35 on the contoured frame 29 of the first x-y translation stage 27. Then the magnets 33, which are either permanent or electrically energized, affix the apertured material 35 to the contoured frame 29. With the apertured material 35 firmly affixed, the first x-y translation stage 27 is moved to each preselected measurement position in accordance with preselected programmed signals from the computer 13.

Also, at each of the above-mentioned preselected measurement positions, an alternate transparent and opaque section 49, preselected by the computer 13, of the comparator mask 45 is positionally aligned with the apertured material 35 by the second x-y translation stage 43. In order to achieve the necessary alignment of the comparator mask 45 and apertured material 35, the computer 13 causes the second x-y translation stage 43 to scan in the x and y directions to determine the points of decrease in optical transmission signals as determined by the light detector 25. Upon determination of the drop off or reduction points of optical transmission in each of the x and y directions, the computer 13 calculates the center of the transmission plateau and directs the positioning of the second x-y translation stage 43 to cause centering thereof on the transmission plateau. Thus, the apertures of the apertured material 35 and the passages of the comparator mask 45 are aligned to provide a maximum optical transmission therethrough.

Figure 5:
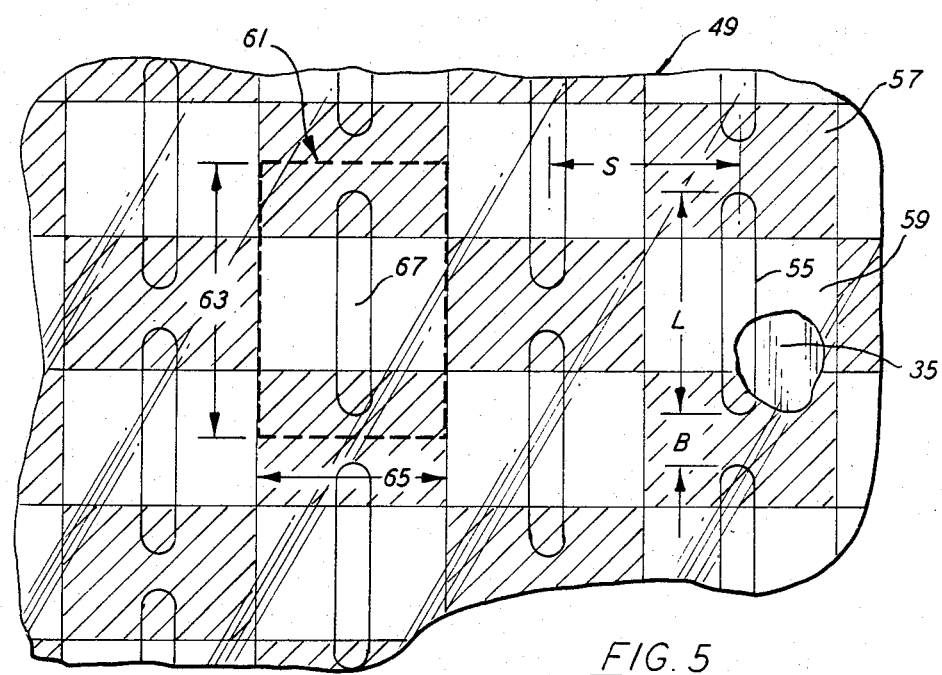
FIG. 5 diagrammatically illustrates a slotted apertured material overlayed by the comparator mask of FIG. 4.

Referring to FIG. 5, an apertured material 35 includes a plurality of spaced slots 55. Also, an overlaying section 49 of a comparator mask 45 includes alternate opaque and transparent sectors, 57 and 59 respectively. Each of the sections 49 of the comparator mask 45 can be divided into what may be termed unit cells 61 with each unit cell 61 including an area equal to the area of a combined opaque and transparent sector 57 and 59. More specifically, each unit cell 61 has a vertical dimension 63 equal to the vertical pitch of the slots 55 or the sum of the vertical slot length L and vertical slot spacing B. The unit cell 61 also has a horizontal dimension 65 equal to the horizontal slot pitch or horizontal slot spacing S.

As previously mentioned, the dimensions of the transparent and opaque sectors 57 and 59 of each section 49 of the comparator mask 45 are known and stored in the computer 13. Thus, the computer 13 selects an appropriate section 49 which is overlayed on the apertured material 35. Overlaying the apertured material 35 with the comparator mask 45 in a manner to provide maximum light transmission capability, as previously explained, insures a substantially rectangular-shaped light transmission area 67 wherein the transmission area 67 is a percentage of the unit cell and has one dimension substantially equal to the dimension of a transparent sector 59 which is known. Thus, the light transmission of the combined aperture mask and the overlayed comparator mask can be equated to the area of the rectangular shaped light transmission area 67 and may be utilized in conjunction with known dimensions of the unit cell and comparator mask overlay to derive a signal representative of the width of slot 55.

Thereafter, signals representative of slot width are easily distributed to a visual display terminal 15 and to a remote video display 17 which may be located in the area of manufacture whereby undesired variations in manufacture may be noted and corrected without undue delay. Also, a printer 19 may be employed should a printed record be desirable.

While there has been shown and described what is at present considered the preferred embodiments of the invention, it will be obvious to those skilled in the art that various changes and modifications may be made therein without departing from the scope of the invention as defined by the appended claims.

INDUSTRIAL APPLICABILITY

Thus, apparatus for automatically measuring aperture size of apertured material has been provided. The apparatus utilizes a comparator mask in conjunction with a light source and light detector to provide signals to a computer whereby aperture size of the apertured material is determined and a signal representative thereof applied to a video display or printer. The apertured material and comparator mask are both positionally located in a light beam in accordance with a preselected program and provide rapid measurements of aperture size independent of operator judgement.

Additionally, a unique process for automatically determining aperture size is provided wherein the apertured material and a comparator mask are both supported and transported into a light beam. This movement is controlled by a computer which responds to signals from a light detector to provide signals representing the dimensions of the apertures of the apertured material. Moreover, the process is unique, rapid, free from operator judgement and inexpensive of skilled labor, time and apparatus.

We claim:

1. Apparatus for automatically measuring aperture size of a slotted apertured material including means for supporting and transporting the slotted apertured material and a light source and a light detector aligned therewith and disposed on opposite sides of the slotted apertured material said light source providing a light beam directed for passage through the slotted apertured material and impingement of the light detector, said apparatus characterized by the improvement comprising:

comparator mask means having a plurality of sections of alternate light opaque and transparent sectors, said sectors of each of said sections being of a given dimension;

means for supporting and transporting said comparator mask means; and means coupled to said means for supporting and transporting the slotted apertured material, said means for supporting and transporting said comparator mask means, and said light detector for selecting a section of said comparator mask means having sectors of a length less than the length of an aperture of said apertured material and overlaying said slotted apertured material with said selected section in a manner to provide a light transparent length of aperture less than the length of said aperture of said slotted apertured material, said means responsive to a signal from said light detector representing light transmission of said slot of a given length for deriving a signal representative of the width of said slot of said slotted apertured material whereby slot length and light transmission of said slot of a given length are utilized to determine slot width.

2. The apparatus of claim 1 including means for effecting a visual display of signals representing said slot width coupled to said means for selecting and overlaying said slotted apertured material and responsive to signals from said light detector.

3. The apparatus of claim 1 wherein said means for supporting and transporting said comparator mask is in the form of an x-y translation stage.

4. The apparatus of claim 1 wherein said means for supporting and transporting said slotted apertured material includes a magnetic means and said slotted apertured material is metallic and affixed to said supporting and transporting means by said magnetic means.

5. The apparatus of claim 1 wherein said means for supporting and transporting said slotted apertured material is in the form of an x-y translation stage.

6. The apparatus of claim 1 wherein said light source is of a form to provide a collimated light beam.

7. Apparatus for automatically measuring aperture size of a slotted apertured material comprising:

means aligned and disposed on opposite sides of said slotted apertured material for providing and detecting a light beam directed to pass through said slotted apertured material;

means for supporting and transporting said slotted apertured material into, within and out of said light beam;

comparator mask means having a plurality of alternate light transparent and opaque sectors of a given dimension;

means for supporting and transporting said comparator mask means at a location spaced from said slotted apertured material and movable into, within and out of said light beam; and means coupled to said means for providing and detecting a light beam, said means for supporting and transporting said slotted apertured material, and said means for supporting and transporting said comparator mask means for controlling the positional locations in said light beam of said slotted apertured material and said comparator mask means and responsive to said means for detecting said light beam, said means effecting the overlaying of said slotted apertured material with said comparator mask to provide a given light transparent slot length and responsive to a signal from said light detector indicating light transmission quantity of said given light transparent slot length whereby slot width is derived from said slot length and light transmitted by said slot of a given length.

8. The apparatus of claim 7 including associated means disposed intermediate said means for detecting a light beam and said comparator mask means for visually observing alignment of said slotted apertured material and said comparator mask means.

9. The apparatus of claim 7 including a shutter means disposed intermediate said light source and said slotted apertured material and coupled to said means for controlling the positional locations in said light beam of said means for supporting and transporting said slotted apertured material and said comparator mask whereby passage of said light beam through said slotted apertured material is controlled.

10. The apparatus of claim 9 wherein said means fo supporting and transporting said slotted apertured material and said comparator mask are in the form of x-y translation stages.

11. The apparatus of claim 7 including a visual display device coupled to said means for controlling the positional locations of said means for supporting and transporting said slotted apertured material and comparator mask and responsive to said light detector whereby a signal representing said derived slot width is applied to said visual display device.

12. In a process for automatically determining aperture size of slotted apertured material utilizing a light source to provide a light beam directed for passage through said slotted apertured material and impingement of a light detector and a comparator mask having a plurality of sections each having dimensionally different alternate light transparent and opaque sectors, the improvement comprising the steps of:

selecting a section of said comparator mask having sectors of a length less than the length of a slot of said slotted apertured material;

overlaying said slotted apertured material with said comparator mask in a manner to provide light transparent slots of a length equal to the length of said sectors and less than the length of a slot and positioned in said light beam; and utilizing a signal from said light detector representative of the light transmission of said light transparent slots of a given length in conjunction with a signal representative of the given length of light transparent slot to derive a signal representative of the width of said slot of said slotted apertured material.

13. The process of claim 12 wherein said step of overlaying said slotted apertured material with said comparator mask includes the steps of supporting and transporting said comparator mask.

14. The process of claim 12 wherein said step of utilizing a signal from said light detector representative of the light transmission of said light transparent slots includes the step of combining said length of light transparent slots and light transmitted by said slots of a given length to derive a signal representative of the width of said slots.

15. In the process of claim 12 wherein a shutter means associated with said light source intermediate thereto and said slotted apertured material, the step of controlling said shutter means to provide and prevent passage of said light beam through said apertured material and impingement of said light detector.

16. In the process of claim 12 wherein is included a visual display device, the step of applying said derived signal representative of the width of said light transparent slots to said device to provide a visual display representing said width of said slots.

17. In the process of claim 12 wherein is provided a means for supporting and transporting said slotted apertured material which includes a magnetic means and said slotted apertured material is metallic, the step of activating said magnetic means to affix said slotted apertured material to said means for supporting and transporting said slotted apertured material.

* * * * *